United States Patent [19]
Elliott et al.

[11] Patent Number: 4,757,958
[45] Date of Patent: Jul. 19, 1988

[54] TAPE REEL

[75] Inventors: James P. Elliott; Vincent E. Landry, both of Saco, Me.

[73] Assignee: Shape Inc., Biddeford, Me.

[21] Appl. No.: 1,208

[22] Filed: Jan. 7, 1987

Related U.S. Application Data

[63] Continuation-in-part of Ser. No. 835,221, Mar. 3, 1986, abandoned.

[51] Int. Cl.⁴ .................. G11B 15/32; G11B 23/04
[52] U.S. Cl. .................................................. 242/199
[58] Field of Search ........................ 242/197–200; 360/132

[56] References Cited

U.S. PATENT DOCUMENTS

| | | | |
|---|---|---|---|
| 3,356,202 | 12/1967 | Goff, Jr. | 197/151 |
| 4,184,650 | 1/1980 | Nelson et al. | 242/71.8 |
| 4,191,984 | 3/1980 | Tsukidate et al. | 360/132 |
| 4,234,140 | 11/1980 | Van Nie et al. | 242/199 |
| 4,248,393 | 2/1981 | Mogi | 242/199 |
| 4,403,749 | 9/1983 | Nakagawa | 242/71.8 |
| 4,452,408 | 6/1984 | Sasaki | 242/199 |
| 4,559,574 | 12/1985 | Umeda | 360/132 |
| 4,560,117 | 12/1985 | Shimizu | 242/199 |

Primary Examiner—David Werner
Attorney, Agent, or Firm—Staas & Halsey

[57] ABSTRACT

A tape cassette is described having top and bottom cassette halves, tape reels and low friction washers between the tape reels and the cassette halves. Each tape reel is made of a plastic hub connected to two plastic flanges, each flange having intentionally curved circumferential edges. Each flange also has a raised, annular centering ring abutting and rotating only on the washers for rotatably supporting the tape reels relative to the tape cassette. These centering rings minimize friction, prevent skewing of the tape reels relative to each other and, along with the curved edges of the flanges, permit the tape to be wound without damage.

5 Claims, 4 Drawing Sheets

TAPE REEL

This application is a continuation-in-part of co-pending U.S. Ser. No. 835,221, filed March 3, 1986, now abandoned entitiled TAPE CASSETTE REEL SUPPORTING STRUCTURE.

BACKGROUND OF THE INVENTION

This invention generally relates to tape cassettes, and more particularly, to a novel structure for the tape reels of a tape cassette to improve operation of the tape cassette and avoid damage of the tape.

A conventional tape cassette tape reel structure is described in U.S. Pat. No. 4,560,117 (the '117 patent), issued to SHIMIZU, and shown in FIG. 1 herein. This figure illustrates top and bottom cassette halves 10, 12, respectively, molded of a clear synthetic resin, a tape guide 14, guide rollers 16 and guide pins 18 located at the front of the cassette half 12. The top and bottom cassette halves 10, 12, each include a pair of annular rings 20 and are connected via screws 22. A pair of tape reels 24 are mounted for centering and rotational support on the annular rings 20. The tape reels 24, which receive the tape 32 thereon, include a pair of planar, parallel and circular flanges 30. The flanges 30 are each stamped components made of metal, such as aluminum, and are attached to a synthetic resin hub 26 via a plurality of raised plastic fitting projections 40 with four circular resin washers 28 therebetween.

Metal is used to form these flanges because the required strength or structural integrity of the flange can be accomplished using a metal flange which is thinner than a comparable plastic flange. As a result, material costs and space useage can be minimized. However, when the flanges are stamped from metal, the edges are necessarily formed perpendicular to the flat, parallel tops and bottoms. In addition, the edges invariably develop burrs through the stamping process which abrade the edges of the tape travelling thereacross during operation. Further, during assembly and later handling, it is possible that one or both of the flanges could be permanently bent. Bending of the flanges occurs particularly when the related tape reel does not include any tape and the cassette halves are pinched in some manner. Once the flanges are bent, the edges of the travelling tape contact the edges of the bent flange or flanges, which also causes tape damage.

The hub 26 has an inner peripheral step 34 formed at a diameter slightly larger than the outside diameter of the corresponding annular ring 20. The ends of the annular rings 20 abut the hubs 26 only at the inner peripheral step 34, such that both sides of the tape reel 24 and the metal flanges 30 are separated from the cassette halves 10, 12, by a specific clearance. Spindles of a tape player recorder (not shown) are received by the center holes 36 formed in the hubs 26, and radial projections 38 extending into the center holes 36 engage the spindles to transfer torque from the rotating spindles to the tape reels 24 through the hub 26.

According to this conventional tape reel supporting structure, the only area of contact between the tape reels and the tape cassette is between the pair of inwardly extending annular rings of relatively small diameter formed on each plastic tape cassette half, and the corresponding inner peripheral steps formed on each plastic tape reel hub for centering purposes. Support of the tape reels in this manner causes the abutting plastic inner peripheral steps and the plastic annular rings to wear due to friction, which in turn generates unwanted noise and debris. In addition, supporting via a relatively small diameter permits skewing of the tape reels relative to each other within the tape cassette, leading to possible edge damage of the tape moving between the skewed tape reels.

From the foregoing, it can be seen that an improved tape reel for a tape cassette is desired which minimizes wear, maintains its intended position and prevents damage to the travelling tape.

SUMMARY OF THE INVENTION

Accordingly, it is an object of the present invention to provide an economical, high quality tape reel capable of being supported with low friction and of preventing damage to travelling tape.

It is another object of the present invention to provide a tape reel capable of being easily formed and assembled by automation.

It is still another object of the present invention to provide a tape reel capable of being rotatably supported farther out from its center than prior art tape reels to improve stability and lessen friction at the area of support.

Finally, it is an object of the present invention to provide a tape reel which efficiently and without damage dispenses tape across the magnetic head of a tape player/recorder.

Additional objects and advantages of the invention will be set forth in part in the description which follows, and, in part will be obvious from the description, or may be learned by practice of the invention. The objects and advantages of the invention may be realized and obtained by means of the instrumentalities and combinations particularly pointed out in the appended claims.

To attain the objects described above according to the present invention, a preferred embodiment of the invention includes a tape cassette having top and bottom cassette halves, tape reels and low-friction washers between the tape reels and the cassette halves. Each tape reel is made up of a plastic hub connected to two plastic flanges, each flange having intentionally curved edges. Each flange also has a raised, annular centering ring abutting and rotating only on the low-friction washers. These centering rings minimize friction, prevent skewing of the tape reels relative to each other and, along with the curved edges of the flanges, permit the tape to be wound without damage.

These, together with other objects and advantages which will become subsequently apparent, reside in the details of construction and operation as more fully hereinafter described and claimed, reference being had to the accompanying drawings forming a part hereof, wherein like numerals refer to like parts throughout.

DESCRIPTION OF THE PREFERRED EMBODIMENTS

The preferred embodiments of the present invention will now be described with reference to FIGS. 2-8.

Figure 1:
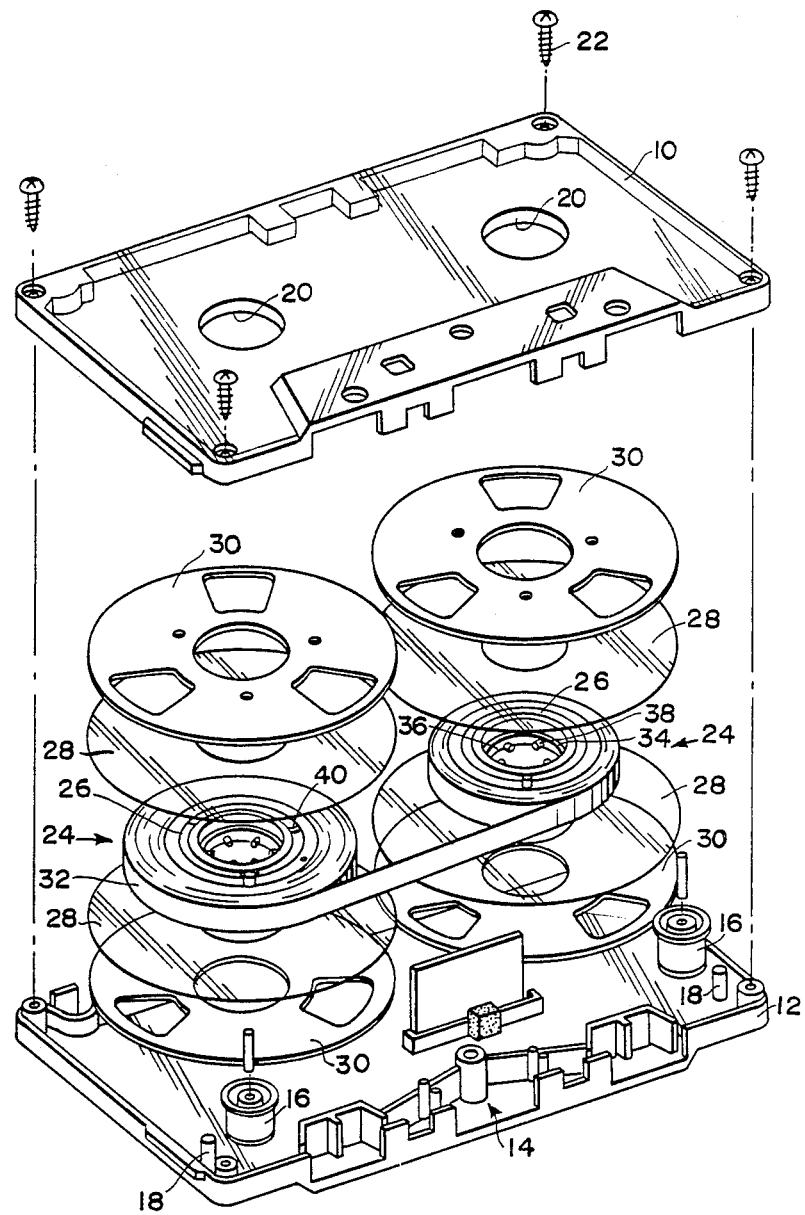
FIG. 1 is an exploded perspective view of a conventional tape cassette, illustrating particularly the tape reels thereof.
Figure 2:
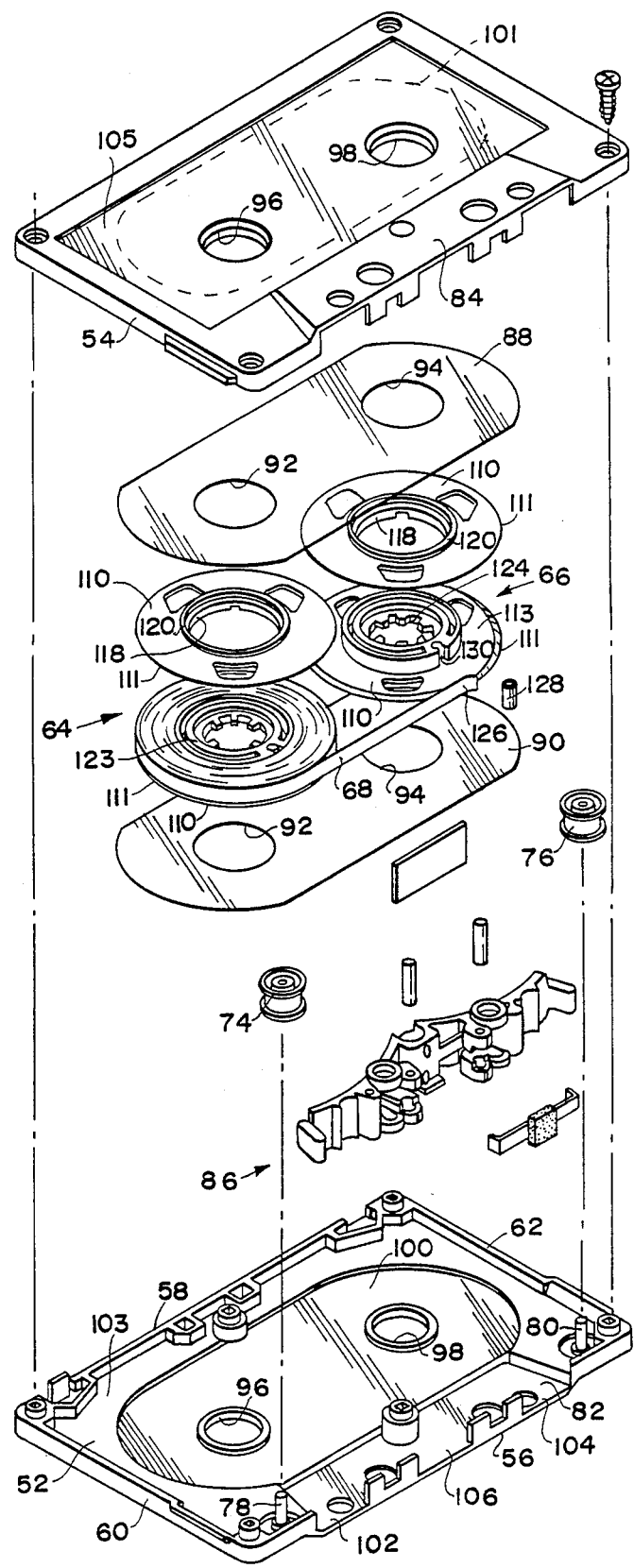
FIG. 2 is an exploded perspective view of the preferred embodiment of the tape cassette according to the present invention.

For convenience of reference to the tape cassette shown in FIG. 2, "front" indicates the area of the tape cassette exposed to the magnetic head of the tape player/recorder, "back" is the area opposite the front, "top" is the planar surface of the cassette facing up when the front of the cassette is inserted into the tape player/recorder, "bottom" is the opposite planar surface parallel the top, and "sides" are the areas extending perpendicularly between and connecting the edges of the top and bottom.

FIG. 2 illustrates a tape cassette 50 including a bottom cassette half 52 and a top cassette half 54 which are preferably made of a clear, hard plastic such as styrene. When assembled, the tape cassette 50 (and accordingly each cassette half 52 and 54) has a front 56, a back 58, a left side 60 and a right side 62.

Elevated areas 82 and 84 are formed in the bottom half 52 and the top half 54 of the tape cassette 50, respectively, for receiving a tape guide 86, such as described in detail in U.S. Pat. No. 4,506,846, introduced above.

As described above, when a conventional metal flange is used and inadvertently bent during assembly or handling, tape damage results during operation. In addition, as with all tape cassettes, the tape reels have a certain amount of play due to intentional clearances. During operation, this play causes the metal flange edges to deliteriously contact the sides of the tape.

With the present invention, however, the flanges are made of plastic instead of metal for two important reasons. First, plastic has "memory," so that when a plastic flange is squeezed or pinched during assembly or handling, it will remember or rebound to its original shape. Second, by using plastic, the edges of the flange can be molded to include an exact curve or radius, which eliminates all burrs or roughness and facilitates tape transport.

As also stated above, metal was chosen for conventional flanges to allow a reduction in the thickness of the flange. Since the present invention uses plastic flanges, the tape cassette must be modified. This modification involves taking material out of the tape cassette, i.e., recesses are created in the tape cassette top and bottom halves for receiving the tape reels with the preferred clearance, the support area of the tape reels is moved from the hub to the flanges, and the tape cassette halves 52 and 54 are made out of a more rigid material.

More particularly, positioned within the tape cassette 50 are a first tape reel 64 and a second tape reel 66 for moving the tape 68 across the tape guide 86, and tape rollers 74, 76. Each tape reel 64 and 66 is preferably made of a darker-colored plastic such as acetal, than the tape cassette halves 52 and 54. The tape rollers 74 and 76, which are also preferably made of a darker-colored, hard plastic, such as acetal, are rotatably received by columns 78 and 80.

The tape reels 64 and 66 with tape 68 extending therebetween are positioned between two washers or liners 88 and 90, which are preferably flat and made of a clear, low-friction, flexible plastic such as an anti-static-treated polyester film. Each of the washers 88 and 90 is substantially a thin, elongated ellipse having holes 92 and 94, respectively, formed therein.

The combination of reels 64 and 66 and washers 88 and 90 are positioned in recessed areas 100 and 101 formed in the bottom and top halves, 52 and 54, respectively, of the tape cassette 50.

The openings 92 and 94 formed in each washer 88, 90, and the openings 118 formed in each flange 110 of the tape reels 64, 66 receive in spaced relation the circular projections 96, 98 formed in the cassette halves 52, 54.

There is also formed in the front 56 of both the bottom half 52 and the top half 54 of the tape cassette 50 a left aperture 102 and a right aperture 104 for receiving the tape player/recorder roller (not shown) to be used together with a drive pin (not shown), and a central aperture 106 for receiving the magnetic head of the tape player/recorder.

As described above, the structures of the top half 54 and bottom half 52 are substantially the same except for minor modifications, so a basic mold could be used to make either half and then the minor modifications could be made. By having substantially similar halves 52 and 54, overall production costs are minimized.

Figure 3:
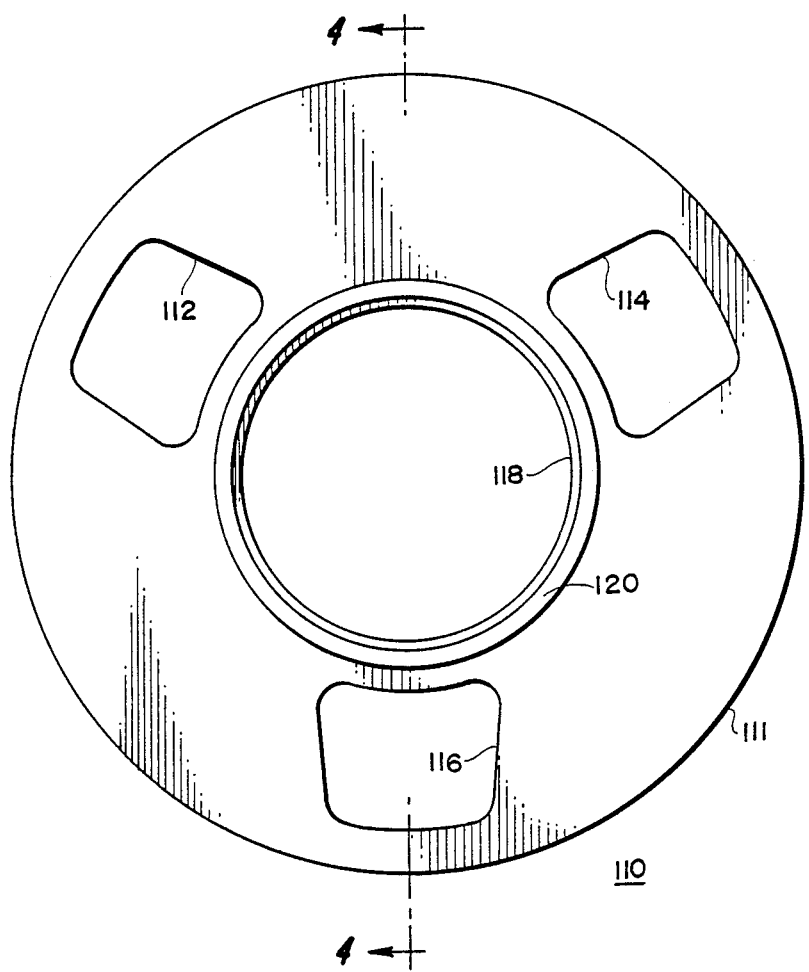
FIG. 3 is a top plan view of the preferred embodiment of one flange of the tape reel according to the present invention.
Figure 4:
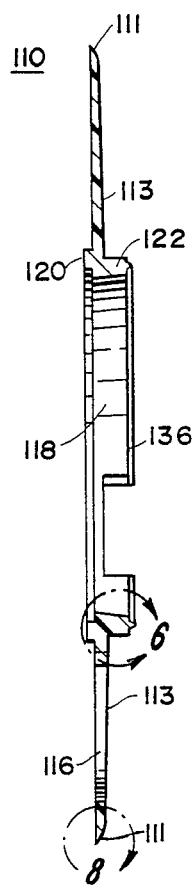
FIG. 4 is a side, cross-sectional view of the preferred embodiment of the flange shown in FIG. 3 according to the present invention, illustrating particularly the centering ring and the curved edges of the flange.
Figure 6:
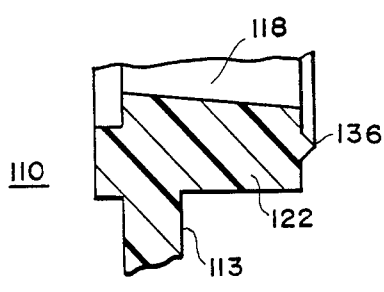
FIG. 6 is a side cross-sectional view of the rib shown in FIG. 5.
Figure 8:
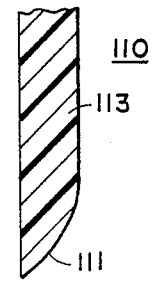
FIG. 8 is a side, cross-sectional view of the curved edge of the flange shown in FIG. 4.

FIGS. 3 and 4 are a top plan view and a side cross-sectional view, respectively, of the preferred embodiment of the flanges 110 according to the present invention. The flanges 110 of the tape reels 64, 66, in contrast to the metal flanges 30 of the prior art tape cassette discussed above, are made of plastic, thus enhancing economics of fabrication and assembly.

Each flange 110 is a circular, relatively flat member having three equally spaced, annular openings 112, 114 and 116 formed therein. In addition, the central opening 118 is formed in the flange 110 for receiving the projections 96, 98 therethrough in spaced relation, as discussed above. Further, each circumferential edge 111 of the flange 110 is curved on the inner side 113 thereof which greatly eliminates damages to the tape travelling across the flange edges 111. Finally, a projecting means 120 is formed on the flange 110 just outside of the central opening 118 for contacting the low-friction washers 88, 90 when assembled. In the preferred embodiment, the projecting means 120 is a centering ring formed on the flange 110.

Figure 5:
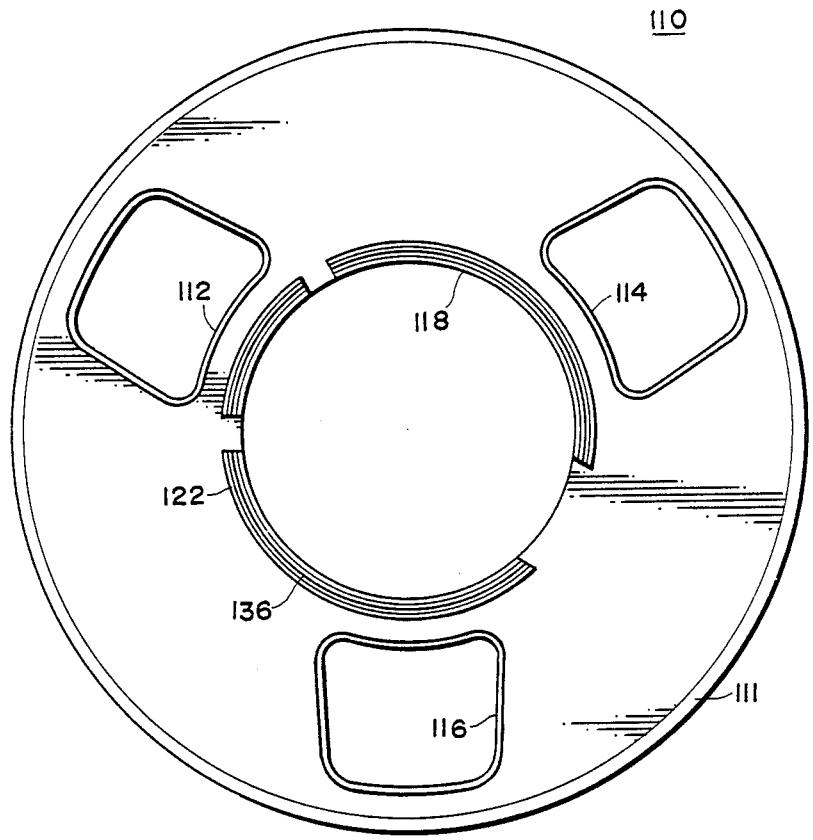
FIG. 5 is a bottom plan view of the preferred embodiment of the tape reel flange according to the present invention shown in FIGS. 3 and 4, illustrating particularly the rib used to attach the flange to the hub.
Figure 7:
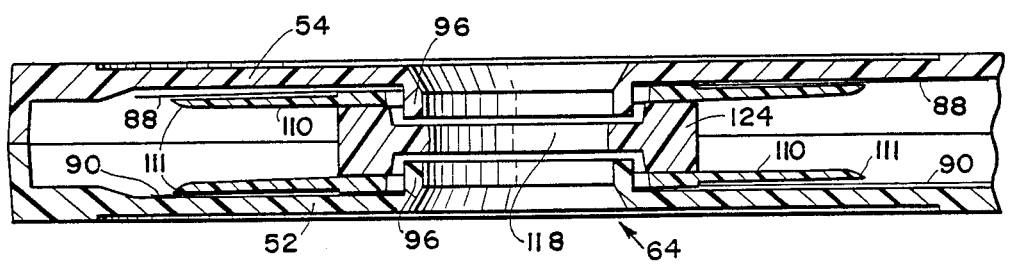
FIG. 7 is a left side, cross-sectional view of the tape cassette according to the present invention.

FIG. 5 is a bottom plan view of the preferred embodiment of the flange 110 of the present invention shown in FIGS. 3 and 4. This figure illustrates an annular projection 122 formed on the bottom of the flange 110, which is attached via ultrasonic welding to a corresponding annular recess 123 formed in each hub 124 (See FIGS. 2 and 7). An energy director 136 is formed from the annular projection 122 to facilitate ultrasonic welding and may be interrupted to allow for knockouts, which are known in the art which result from the molding process.

Again referring to FIG. 2, during assembly, the hub 124 is assembled with a leader tape 126 via a staking rod 128 into a hole 130 formed in the hub 124. Then, the flanges 110 are centered on the hub 124 and ultrasonically welded thereto at the interface of the respective projections 122 and recesses 123. The assembled tape reels 64, 66 are then placed between the washers 88 and 90 and the cassette halves 52, 54, as described above.

As opposed to the prior art discussed above, with the present invention the only area of rotatable support for the tape reels 64, 66, is the interface of the centering rings 120 and the washers 88 and 90. This tape reel support structure results in quiet, debris-free and low-friction operation.

The recessed areas 100, 101 provide adequate clearance for the tape reels 64, 66, thus allowing efficient rotation without contacting the tape cassette halves 52, 54, except at the centering rings 120. On the other hand, the areas 103, 105 of relative elevation around the perimeter of the tape cassette halves 52 and 54 maintain proper orientation of the tape 68 relative to the tape reels 64, 66.

The tape reel of the present invention, in comparison with the prior art discussed above: (a) provides more efficient assembly and operation of a tape cassette; (b) requires only two washers instead of four for ease and greater speed of assembly; (c) supports the tape reels only via centering rings which have a sufficiently large diameter to minimize skewing of the tape reels relative to the ideal tape path, hence eliminating tape edge damage; (d) moves the area of rotational support of the tape reels away from the relatively high friction tape cassette halves to the relatively low friction washers to minimize wear, debris and noise; (e) prevents tape damage; and (f) due to the extensive use of plastic, provides a more efficiently manufactured tape cassette. In addition, the tape cassette of the present invention may be fabricated from different colored plastics, i.e., the top and bottom halves of the cassette may be made of clear, styrene plastic, the washers made of a clear, antistatic-treated polyester film, the bridge made of a darker plastic such as "ABS" (acrylonitrile butadiene styrene) and the tape reels and rollers made of a darker plastic such as acetal. This contrasting color combination provides an aesthetically pleasing tape cassette from a marketing standpoint, but, most importantly allows the manufacturer and user to view the operation of the cassette, which, of course, is a functional advantage.

The foregoing is considered as illustrative only of the principles of the invention. For example, the above-described tape cassette has been shown to be of the type intended for use in analog and digital audio tape player/recorder. However, the invention can be similarly applied to tape cassettes for use in video or other playing and/or recording apparati. In addition, although a three-piece tape reel 62, 64 is described, a one-piece, integrally molded, tape reel could be substituted. Further, since numerous modifications and changes will readily occur to those skilled in the art, it is not desired to limit the invention to the exact construction and operation of the embodiments shown and described. Accordingly, all suitable modifications and variations falling within the scope of the appended claims and their equivalents are intended.

We claim:

1. A tape cassette including first and second halves, comprising:
   (a) an elliptical, recessed area formed in each of the first and second halves;
   (b) a pair of low-friction, flat washers received by the elliptical recessed areas formed in the cassette halves; and
   (c) a pair of tape reels, each including
      (i) a tape reel hub,
      (ii) first and second substantially flat flanges connected to opposite surfaces of the hub, each including a planar top, a planar bottom, a curved, circumferential edge joining the planar top and bottom, and a ring formed annularly thereon to extend above the plane of the respective flange and away from the direction of the hub to contact the washers and locate the tape reel radially and axially relative to the tape cassette.

2. The tape cassette as recited in claim 1, wherein the hub and the first and second flanges are plastic molded and are connected via ultrasonic welding.

3. A tape cassette, comprising:
   (a) first and second cassette halves, each half having a pair of apertures surrounded by an inwardly extending annular projection which is aligned with an aperture and an annular projection on the other cassette half and having an elliptical recessed area formed therein;
   (b) a pair of low-friction, flat washers received by the recessed areas; and
   (c) a pair of tape reels, each including
      (i) a hub,
      (ii) first and second flanges, each having a planar top, a planar bottom and a curved circumferential edge joining the planar top and bottom, the bottoms being connected to the hub,
      (iii) openings formed centrally in the hub for receiving with a clearance therebetween along their entire surfaces the annular projections, and
      (iv) an annular ring formed on the top of each flange to abut the respective washers,
   wherein the flanges are otherwise separated by a clearance from the two cassette halves.

4. The tape cassette as recited in claim 3, wherein the first and second cassette halves and the first and second washers are formed of a clear material, and the tape guide and the tape reels and the first and second tape rollers are formed of a relatively darker material.

5. The tape cassette as recited in claim 4, wherein the hub and the first and second flanges are plastic molded and are connected via ultrasonic welding.

* * * * *